(12) United States Patent
Hirota et al.

(10) Patent No.: US 12,292,990 B2
(45) Date of Patent: May 6, 2025

(54) MANAGEMENT DEVICE, MANAGEMENT SYSTEM, MANAGEMENT METHOD, AND NON-TRANSITORY COMPUTER-READABLE MEDIUM STORING PROGRAM

(71) Applicants: NEC Corporation, Tokyo (JP); NEC Solution Innovators, Ltd., Tokyo (JP)

(72) Inventors: Takumi Hirota, Tokyo (JP); Atsushi Kataoka, Tokyo (JP)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 231 days.

(21) Appl. No.: 18/009,167

(22) PCT Filed: Jun. 11, 2020

(86) PCT No.: PCT/JP2020/023080
§ 371 (c)(1),
(2) Date: Dec. 8, 2022

(87) PCT Pub. No.: WO2021/250862
PCT Pub. Date: Dec. 16, 2021

(65) Prior Publication Data
US 2023/0229798 A1  Jul. 20, 2023

(51) Int. Cl.
*H04L 29/06* (2006.01)
*G06F 21/60* (2013.01)
*G06F 21/62* (2013.01)

(52) U.S. Cl.
CPC ........ *G06F 21/6218* (2013.01); *G06F 21/602* (2013.01)

(58) Field of Classification Search
CPC .......................... G06F 21/6218; G06F 21/602
(Continued)

(56) References Cited

U.S. PATENT DOCUMENTS 8,613,108 B1 * 12/2013 Aggarwal .......... H04N 21/2265
455/411
2006/0015499 A1 * 1/2006 Clissold .................. G06F 16/10
707/999.009
(Continued)

FOREIGN PATENT DOCUMENTS

JP 2005-092729 A 4/2005
JP 2010-154419 A 7/2010
(Continued)

OTHER PUBLICATIONS

JP Office Action for JP Application No. 2022-530466, mailed on Feb. 6, 2024 with English Translation.
(Continued)

*Primary Examiner* — Jeffrey C Pwu
*Assistant Examiner* — Samuel Ambaye

(57) ABSTRACT

According to an example embodiment, a management server includes a monitoring means for monitoring whether a file has been saved in a storage area managed by a file server, a determination means for determining, when the monitoring means detects that a file has been saved in the storage area, whether identification information on a user who has saved the file matches identification information on a specific user, and a privilege change means for changing, when the determination means determines that the identification information on the user who has saved the file matches the identification information on the specific user, an access privilege of the file.

11 Claims, 6 Drawing Sheets

(58) Field of Classification Search
USPC .......................................................... 713/165
See application file for complete search history.

(56) References Cited

U.S. PATENT DOCUMENTS

| | | | | |
|---|---|---|---|---|
| 2011/0051193 A1* | 3/2011 | Okabe | .................. | H04N 1/2179 |
| | | | | 358/1.16 |
| 2011/0161370 A1* | 6/2011 | Miyamae | ................ | G06F 16/10 |
| | | | | 707/E17.143 |
| 2018/0285583 A1* | 10/2018 | Dogu | .................... | H04L 9/0894 |

FOREIGN PATENT DOCUMENTS

| | | |
|---|---|---|
| JP | 2012-141744 A | 7/2012 |
| JP | 2014-006679 A | 1/2014 |
| WO | 2009/125830 A1 | 10/2009 |

OTHER PUBLICATIONS

International Search Report for PCT Application No. PCT/JP2020/023080, mailed on Sep. 29, 2020.

* cited by examiner

MANAGEMENT DEVICE, MANAGEMENT SYSTEM, MANAGEMENT METHOD, AND NON-TRANSITORY COMPUTER-READABLE MEDIUM STORING PROGRAM

This application is a National Stage Entry of PCT/JP2020/023080 filed on Jun. 11, 2020, the contents of all of which are incorporated herein by reference, in their entirety.

TECHNICAL FIELD

The present invention relates to a management device, a management system, a management method, and a non-transitory computer-readable medium storing a program.

BACKGROUND ART

There is no end to the number of security incidents in which confidential information is stolen by viruses (targeted attacks) and leaked to outside parties. Anti-virus measures and closing holes in information leakage routes are not sufficient for a risk of failing to respond to new attacks that occur daily. Therefore, it is important to take measures based on the assumption that information will be leaked, that is, file encryption measures to protect information (files) by encrypting the information itself. A technique related to file encryption is disclosed in, for example, Patent Literature 1.

CITATION LIST

Patent Literature

Patent Literature 1: Japanese Unexamined Patent Application Publication No. 2010-154419

SUMMARY OF INVENTION

Technical Problem

File encryption is characterized by the fact that the encryption status of and an access privilege of a file are maintained even if the storage location of the file is changed. Therefore, even if the storage location of a file is unintentionally changed due to information leakage or the like, high confidentiality is ensured. However, even if the storage location of a file is intentionally changed for legitimate reasons, the access privilege of the file is not changed, and a user who should be given the access privilege cannot open the file, which causes a problem of decrease in convenience.

The present disclosure has been made to solve such a problem, and a purpose of the present disclosure is to provide a management device, a management system, a management method, and a non-transitory computer-readable medium storing a program that are capable of improving convenience while ensuring high confidentiality.

Solution to Problem

A management device according to the present disclosure includes a monitoring means for monitoring whether a file has been saved in a storage area managed by a file server, a determination means for determining, when the monitoring means detects that a file has been saved in the storage area, whether identification information on a user who has saved the file matches identification information on a specific user, and a privilege change means for changing, when the determination means determines that the identification information on the user who has saved the file matches the identification information on the specific user, an access privilege of the file.

A management method according to the present disclosure includes a monitoring step of monitoring whether a file has been saved in a storage area managed by a file server, a determination step of determining, when it is detected that a file has been saved in the storage area in the monitoring step, whether identification information on a user who has saved the file matches identification information on a specific user, and a privilege change step of changing, when it is determined that the identification information on the user who has saved the file matches the identification information on the specific user in the determination step, an access privilege of the file.

A non-transitory computer-readable medium according to the present disclosure stores a management program to execute a monitoring process of monitoring whether a file has been saved in a storage area managed by a file server, a determination process of determining, when it is detected that a file has been saved in the storage area in the monitoring process, whether identification information on a user who has saved the file matches identification information on a specific user, and a privilege change process of changing, when it is determined that the identification information on the user who has saved the file matches the identification information on the specific user in the determination process, an access privilege of the file.

Advantageous Effects of Invention

According to the present disclosure, it is possible to provide a management device, a management system, a management method, and a non-transitory computer-readable medium storing a program that are capable of improving convenience while ensuring high confidentiality.

EXAMPLE EMBODIMENT

Specific example embodiments will be described hereinafter in detail with reference to the drawings. The same or corresponding elements are denoted by the same reference signs throughout the drawings, and duplicated explanations are omitted as necessary for the sake of clarity.

First Example Embodiment

Figure 1:
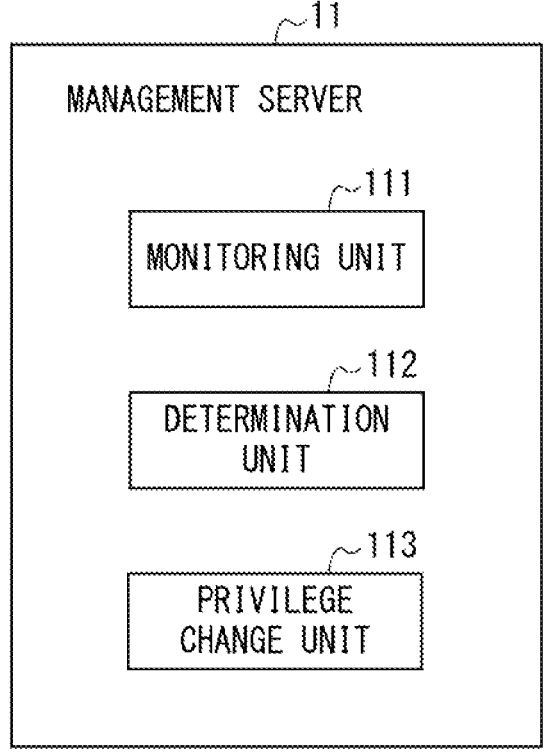
FIG. 1 is a block diagram showing a configuration example of a management server according to a first example embodiment.

FIG. 1 is a block diagram showing a configuration example of a management server (management device) 11 according to a first example embodiment. The management server 11 according to the present example embodiment manages changes in access privileges and changes, only when a user who has saved (moved or duplicated) a file on a file server is a specific user, the access privilege of the file to the access privilege corresponding to the saving location. This enables the management server 11 according to the present example embodiment to improve convenience while ensuring high confidentiality. The following is a specific description.

As shown in FIG. 1, the management server 11 includes a monitoring unit (monitoring means) 111, a determination unit (determination means) 112, and a privilege change unit (privilege change means) 113. The management server 11 is connected via a wired or wireless network 16 to a storage unit (storage means) 12, a file server 13, a user terminal 14, and the like (all not shown).

The storage unit 12 stores identification information (ID) on a specific user. The specific user is a user who is permitted to change an access privilege of a file saved in a storage area managed by the file server 13. The number of specific users is not limited to one but may be multiple. The specific user may be permitted to change access privileges of all files saved in the storage area managed by the file server 13, or may be permitted to change an access privilege only of a designated file. In addition, the storage unit 12 stores key information such as encryption keys for encrypting files and decryption keys for decrypting encrypted files. The storage unit 12 may be provided inside the management server 11.

The file server 13 manages files saved in a storage area provided inside or outside the file server 13 and the access privileges of the files. In the storage area managed by the file server 13, a file is stored in association with its file ID, saving location, and access privilege information. The storage area managed by the file server 13 is not limited to a storage area in a closed network environment such as an in-house network, but also includes cloud storage. The storage area also includes local disks and the like.

A file is saved (moved or duplicated) by a user, for example, via the user terminal 14 and is basically encrypted in such a manner that only a user having the access privilege can decrypt it. However, a file that is newly registered is unencrypted and in plain text in some cases. The access privilege is usually designated for each file saving location (for example, a folder).

The monitoring unit 111 monitors whether a file has been saved in the storage area managed by the file server 13.

For example, the monitoring unit 111 may monitor whether a file has been saved in the storage area managed by the file server 13 periodically or at a timing when an event occurs in the file server 13. Alternatively, if the file server 13 has a function of sending a notification indicating that a file has been saved, the monitoring unit 111 may monitor whether a file has been saved in the storage area managed by the file server 13 according to the notification from the file server 13.

When detecting that a file has been saved in the storage area managed by the file server 13, the monitoring unit 111 acquires the ID of the user who has saved the file, the saving location of the file, and the file ID.

When it is detected that a file has been saved in the storage area managed by the file server 13, the determination unit 112 determines whether the ID of the user who has saved the file matches the ID of the specific user stored in the storage unit 12.

When it is determined that the ID of the user who has saved the file in the storage area managed by the file server 13 matches the ID of the specific user stored in the storage unit 12, the privilege change unit 113 changes the access privilege of the file. For example, the privilege change unit 113 changes the access privilege of the file to an access privilege designated for the saving location of the file. This allows the file to be used by the user who will be permitted to access the new saving location, thereby improving convenience.

Alternatively, when it is determined that the ID of the user who has saved the file in the storage area managed by the file server 13 does not match the ID of the specific user stored in the storage unit 12, the privilege change unit 113 does not change the access privilege of the file. In other words, if a file has been saved by a user who is not permitted to change an access privilege (a user other than the specific user), the access privilege of the file is not changed. This means that even if, for example, a malicious user moves a file for the purpose of information leakage, the access privilege is not changed and is maintained in the previous state, thereby ensuring high confidentiality.

Note that, if a file saved in the storage area managed by the file server 13 is in plain text, the privilege change unit 113 changes the access privilege of the file to the access privilege designated for the saving location of the file, regardless of the determination result of the determination unit 112. However, if a file is in plain text but there is no need to set the access privilege of the file, the privilege change unit 113 may not change the access privilege of the file (that is, may not set any restrictions on the access privilege of the file).

(Operation of Management Server 11)

Next, an operation of the management server 11 is described with reference to FIG. 2.

Figure 2:
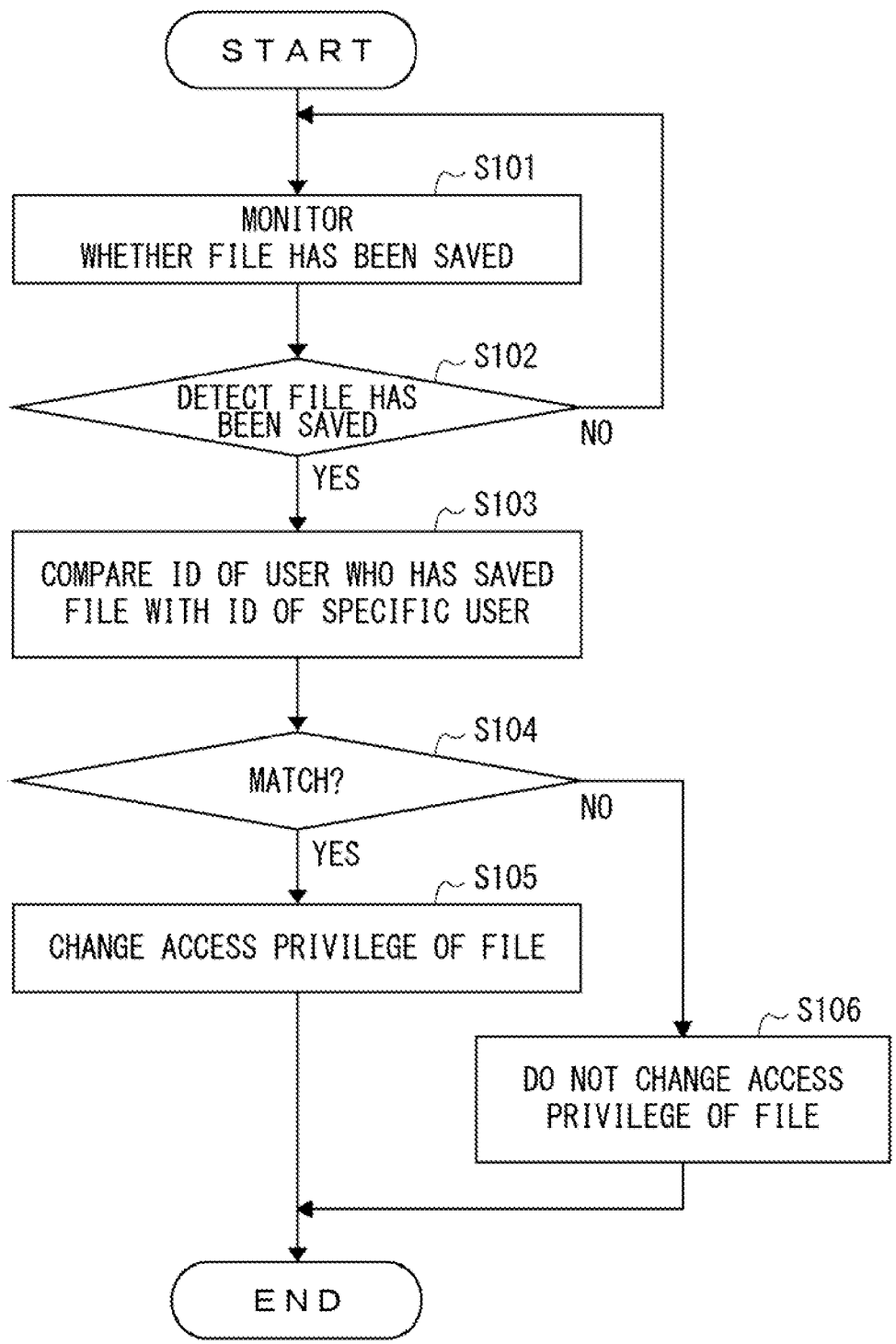
FIG. 2 is a flowchart showing an operation of the management server shown in FIG. 1.

FIG. 2 is a flowchart showing the operation of the management server 11.

The following description is an example in which a user U1 has moved a file f1 from a folder FD1 to a folder FD2 via the user terminal 14. In this example, it is assumed that users U1, U2, and U3 are designated as having the access privilege of the folder FD1, and that users U1, U4, and U5 are designated as having the access privilege of the folder FD2. In this example, it is also assumed that the ID of the user U1 is registered as the ID of the specific user.

The monitoring unit 111 monitors whether a file has been saved (moved or duplicated) in the storage area managed by the file server 13 (step S101).

When detecting that a file has been saved in the storage area managed by the file server 13 (YES in step S102), the monitoring unit 111 acquires the ID of the user who has saved the file, the saving location of the file, and the file ID.

In this example, the monitoring unit 111 acquires the ID of the file f1 as the file ID, information on the folder FD2 as the saving location of file f1, and the ID of the user U1 as the ID of the user who has saved file f1.

Then, the determination unit 112 determines whether the ID of the user who has saved the file f1 matches the ID of the specific user (step S103).

For example, when the ID of the user who has saved the file f1 in the storage area managed by the file server 13 matches the ID of the specific user (YES in step S104), the privilege change unit 113 changes the access privilege of the file f1 (step S105).

On the other hand, when the ID of the user who has saved the file f1 in the storage area managed by the file server 13 does not match the ID of the specific user (NO in step S104), the privilege change unit 113 does not change the access privilege of the file f1 (step S106).

In this example, both the ID of the user who has saved the file f1 in the storage area managed by the file server 13 and the ID of the specific user match the ID of the user U1. Therefore, the privilege change unit 113 changes the access privilege of the file f1 from the users U1, U2, and U3 designated for the folder FD1 to the users U1, U4, and U5 designated for the folder FD2. This allows not only the user U1 but also the users U4 and U5 to use the file f1.

If the file f1 is moved from the folder FD1 to the folder FD2 by the user U2 who is not the specific user, the privilege change unit 113 does not change the access privilege of the file f1. In this case, the users U4 and U5 still cannot use the file f1. This prevents information leakage and ensures high confidentiality.

In this manner, when a user who has saved a file in the storage area managed by the file server 13 is the specific user, the management server 11 according to the present example embodiment changes the access privilege of the file to the access privilege corresponding to the saving location. This enables the file to be used by the use who will be permitted to access the new saving location, thereby improving convenience. In addition, when a user who has saved a file in the storage area managed by the file server 13 is not the specific user, the management server 11 according to the present example embodiment does not change the access privilege of the file. This means that even if, for example, a malicious user moves a file for the purpose of information leakage, the access privilege is not changed and is maintained in the previous state, thereby ensuring high confidentiality. In other words, the management server 11 according to the present example embodiment can improve convenience while ensuring high confidentiality.

Note that the management server 11 includes a processor, a memory, and a storage device that are not shown in the drawings. In addition, the storage device stores a computer program in which the processing of the management server 11 according to the present example embodiment is implemented. Then, the processor loads the computer program from the storage device into the memory and executes the computer program. The processor thereby implements the functions of the monitoring unit 111, the determination unit 112, and the privilege change unit 113.

Alternatively, the monitoring unit 111, the determination unit 112, and the privilege change unit 113 each may be implemented by dedicated hardware. In addition, a part or all of the constituent elements of each device may be implemented by a general-purpose or dedicated circuitry, a processor, or the like or a combination thereof. These may be configured by a single chip or a plurality of chips connected via a bus. A part or all of the constituent elements of each device may be implemented by a combination of the circuitry or the like described above and a program. In addition, as a processor, a central processing unit (CPU), a graphics processing unit (GPU), a field-programmable gate array (FPGA) or the like can be used.

If a part or all of the constituent elements of the management server 11 are implemented by a plurality of information processing devices, circuitries, or the like, the plurality of information processing devices, circuitries, or the like may be collectively or dispersedly arranged. For example, the information processing devices, circuitries, or the like may be implemented by being connected with each other via a communication network, such as a client server system or a cloud computing system. In addition, the function of the management server 11 may be provided in a form of Software as a Service (Saas).

Second Example Embodiment

Figure 3:
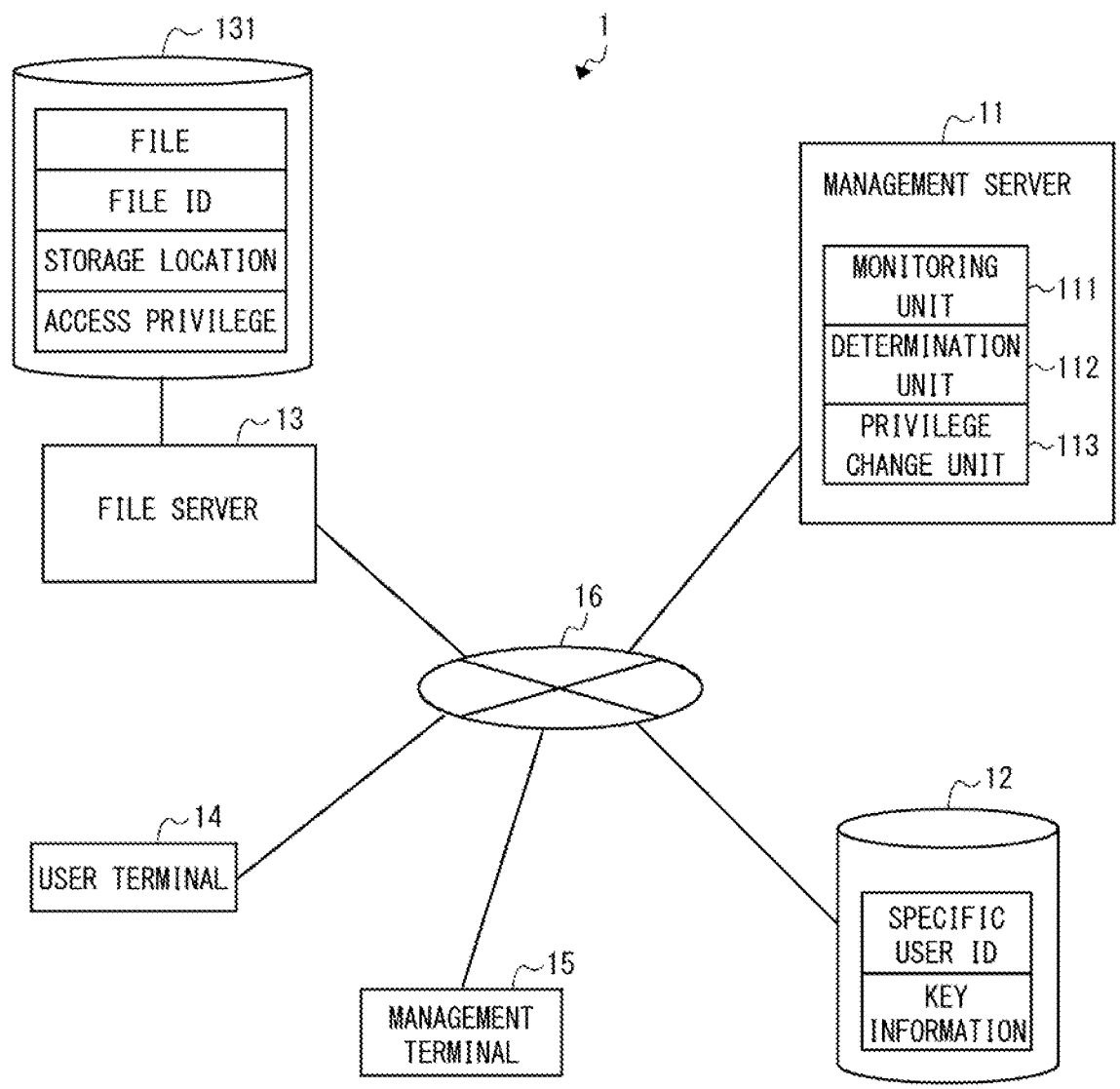
FIG. 3 is a block diagram showing a configuration example of a management system according to a second example embodiment.

FIG. 3 is a block diagram showing a configuration example of a management system 1 according to a second example embodiment.

As shown in FIG. 3, the management system 1 includes a management server (management device) 11, a storage unit 12, a file server 13, a user terminal 14, a management terminal 15, and a network 16. The management server 11, the storage unit 12, the file server 13, the user terminal 14, and the management terminal 15 are connected with each other via the network 16.

The storage unit 12 stores the ID of a specific user. The specific user is a user who is permitted to change an access privilege of a file saved in a storage area managed by the file server 13. The number of specific users is not limited to one but may be multiple. The specific user may be permitted to change access privileges of all files saved in the storage area managed by the file server 13, or may be permitted to change an access privilege only of a designated file. In addition, the storage unit 12 stores key information such as encryption keys for encrypting files and decryption keys for decrypting encrypted files. The storage unit 12 may be provided inside the management server 11.

The file server 13 manages files saved in a storage area 131 provided inside or outside the file server 13 and the access privileges of the files. In the storage area 131 managed by the file server 13, a file is stored in association with its file ID, saving location, and access privilege information. The storage area managed by the file server 13 is not limited to a storage area in a closed network environment such as an in-house network, but also includes a cloud storage. The storage area also includes local disks and the like.

A file is saved (moved or duplicated) by a user, for example, via the user terminal 14 and is basically encrypted in such a manner that only a user having the access privilege can decrypt it. However, a file that is newly registered is unencrypted and in plain text in some cases. The access privilege is usually designated for each file saving location (for example, a folder).

The management server 11 manages changes in an access privilege of each file saved in the storage area 131 managed by the file server 13. The constitutional elements of the management server 11 have already been described.

(Configuration Example of Privilege Change Unit 113)

Figure 4:
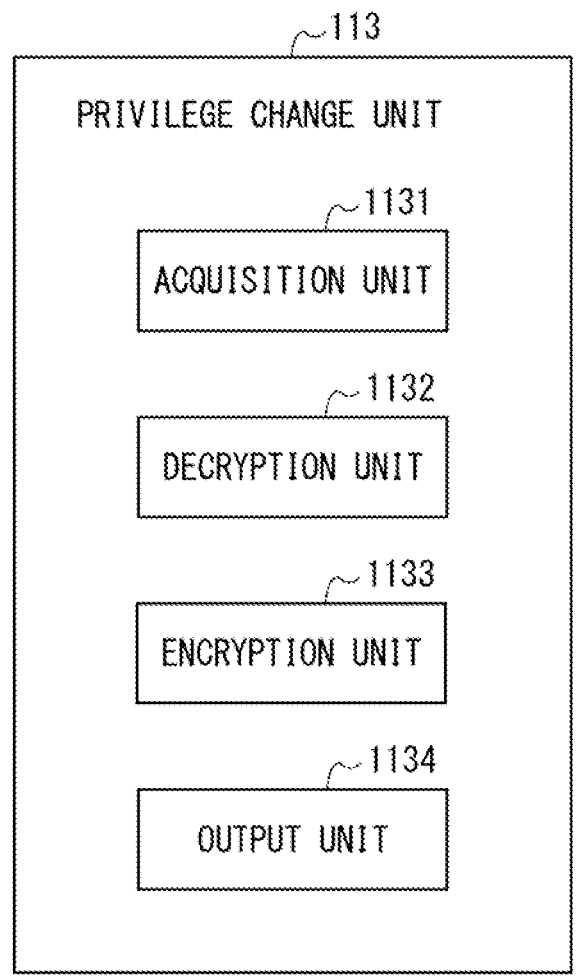
FIG. 4 is a block diagram showing a configuration example of a privilege change unit provided in the management server shown in FIG. 1.

FIG. 4 is a block diagram showing a configuration example of a privilege change unit 113 provided in the management server 11. As shown in FIG. 4, the privilege change unit 113 includes an acquisition unit 1131, a decryption unit 1132, an encryption unit 1133, and an output unit 1134.

When it is determined that the ID of a user who has saved a file in the storage area 131 matches the ID of the specific user, the acquisition unit 1131 acquires, from the file server 13, an encrypted file and information on the access privilege designated for the saving location of the file.

The decryption unit 1132 decrypts the encrypted file acquired by the acquisition unit 1131. The encryption unit 1133 encrypts the file decrypted by the decryption unit 1132 after changing the access privilege according to the access privilege information acquired by the acquisition unit 1131.

The output unit 1134 outputs the file encrypted by encryption unit 1133 to the storage source of its original file. This overwrites the original file with the encrypted file output from the privilege change unit 113.

(Operation of Management System 1)

Figure 5:
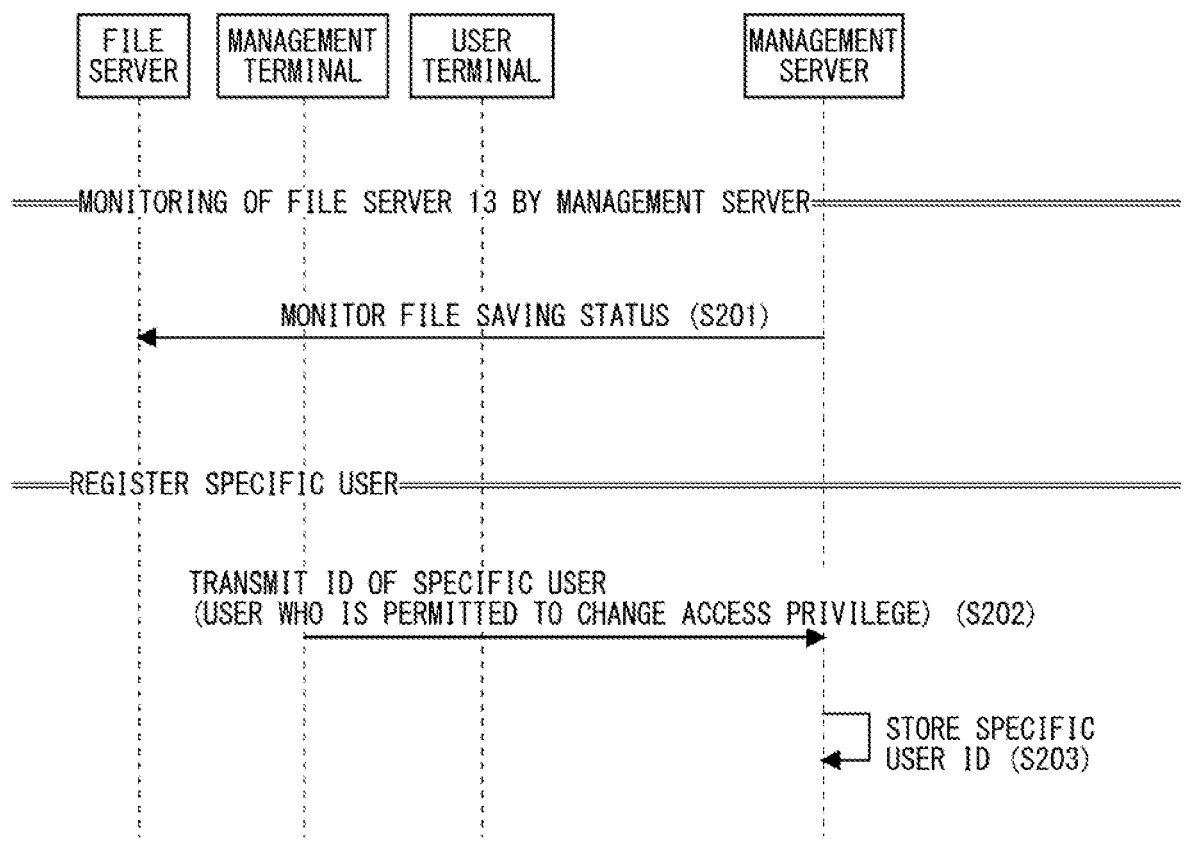
FIG. 5 is a sequence diagram showing a processing procedure of the management system shown in FIG. 3.
Figure 6:
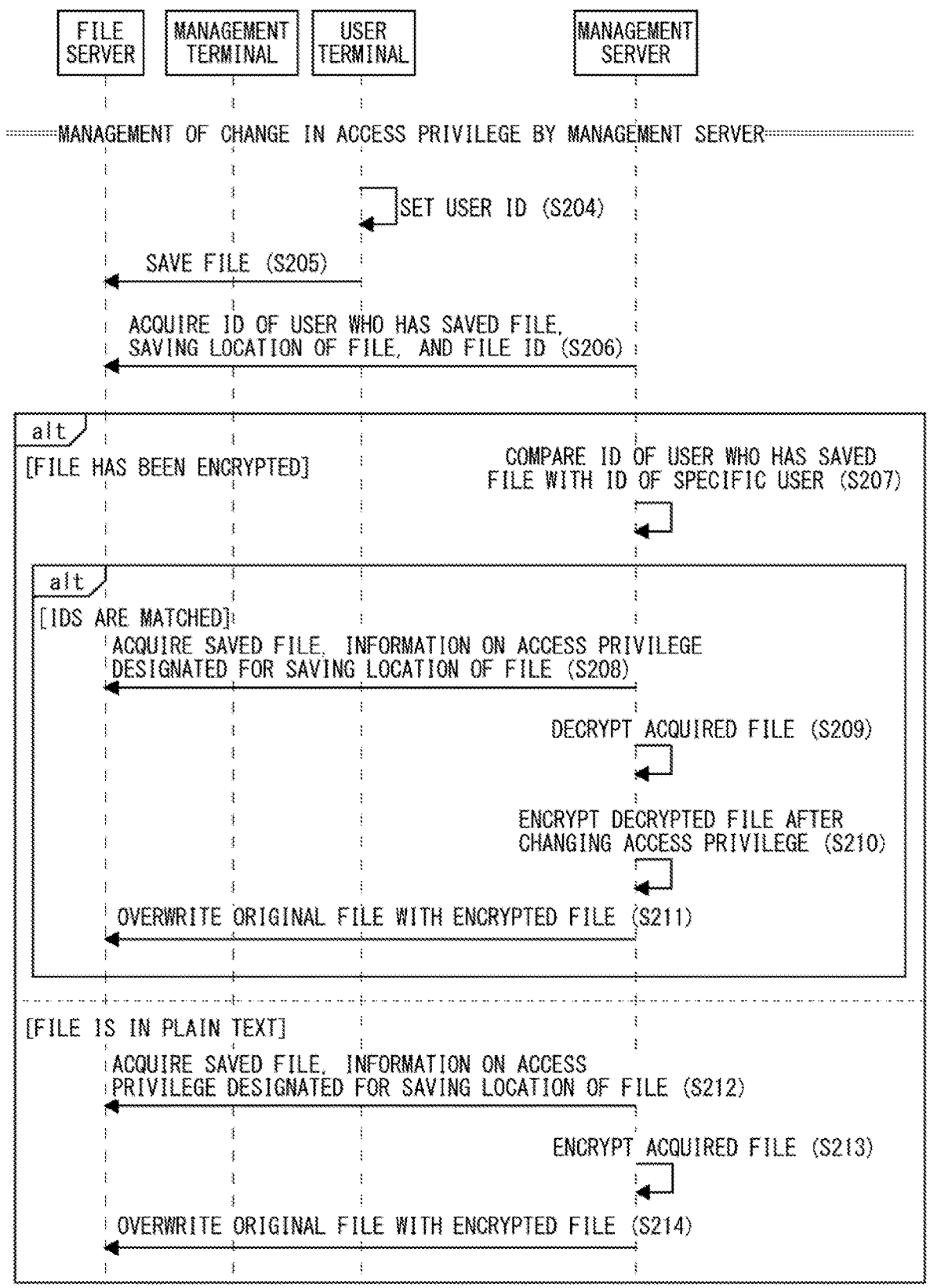
FIG. 6 is a sequence diagram showing a processing procedure of the management system shown in FIG. 3.

Next, the operation of the management system 1 is described with reference to FIGS. 5 and 6 in addition to FIGS. 3 and 4. FIGS. 5 and 6 are sequence diagrams showing the operation of the management system 1.

First, the monitoring of the file server 13 by the management server 11 is described.

The management server 11 monitors the status of a file saved in the storage area 131 managed by the file server 13 during startup (step S201).

The management server 11 may monitor whether a file has been saved in the storage area 131 managed by the file server 13 periodically or at a timing when an event occurs in the file server 13. Alternatively, if the file server 13 has a function of sending a notification indicating the status of the saved file, the management server 11 may monitor the status of the saved file according to the notification from the file server 13.

Next, the registration of the specific user is described.

The ID of the specific user is transmitted from, for example, the management terminal 15 and registered in the storage unit 12 (steps S202→S203).

The ID of the specific user may be the ID of a user who has an access privilege of the file saved in the storage area 131 managed by the file server 13.

Alternatively, the ID of the specific user may be the ID of a user whose access frequency to the file server 13 is equal to or greater than a threshold. The user whose access frequency to the file server 13 is equal to or greater than the threshold is, for example, an employee whose access frequency to a specific folder is equal to or greater than a threshold among multiple employees who have the access privilege of the specific folder. Such employees can be identified from, for example, access logs included in event logs. Alternatively, the ID of the specific user may be determined based on the organization and privilege information managed in a user management system or the like, which is provided separately from the management system 1.

The management server 11 may acquire the ID of the specific user periodically, each time an event is detected, or each time it is needed. If the ID is acquired each time it is needed, the storage unit 12 is not necessary.

Next, the management of changes in access privileges by the management server 11 is described.

The following description is an example in which a user U1 has moved a file f1 from a folder FD1 to a folder FD2 via the user terminal 14. In this example, it is assumed that users U1, U2, and U3 are designated as having the access privilege of the folder FD1, and that users U1, U4, and U5 are designated as having the access privilege of the folder FD2. In this example, it is also assumed that the ID of the user U1 is registered as the ID of the specific user.

First, a user ID is initially set to the management system 1 (step S204). The user ID at this time may be the user ID logged into the user terminal 14.

Then, a file is saved via the user terminal 14 in the storage area 131 managed by the file server 13 (step S205). In this example, the user U1 moves the file f1 from the folder FD1 to the folder FD2 via the user terminal 14.

When detecting that a file has been saved in the storage area 131 managed by the file server 13, the management server 11 acquires the ID of the user who has saved the file, the saving location of the file, and the file ID (step S206).

In this example, the management server 11 acquires the ID of the file f1 as the file ID, the information on the folder FD2 as the saving location of the file f1, and the ID of the user U1 as the ID of the user who has saved file f1.

Then, the management server 11 determines whether the ID of the user who has saved the file f1 matches the ID of the specific user ID (step S207).

For example, when the ID of the user who has saved the file f1 in the storage area 131 managed by the file server 13 matches the ID of the specific user, the management server 11 changes the access privilege of the file f1.

More specifically, first, the management server 11 acquires, from the file server 13, the encrypted file f1 and information on the access privilege designated for the saving location of the file f1 (step S208). Then, the management server 11 decrypts the acquired encrypted file f1 with a decryption key (step S209). Then, the management server 11 encrypts the decrypted file f1 after changing the access privilege according to the access privilege information acquired from the file server 13 (step S210). Then, the management server 11 outputs the re-encrypted file f1 to the storage source of its original file. The original file is thereby overwritten with the re-encrypted file f1 (step S211).

On the other hand, when the ID of the user who has saved the file f1 in the storage area 131 managed by the file server 13 does not match the ID of the specific user, the management server 11 does not change the access privilege of the file f1.

In this example, both the ID of the user who has saved the file f1 in the storage area 131 managed by the file server 13 and the ID of the specific user match the ID of the user U1. Therefore, the management server 11 changes the access privilege of the file f1 from the users U1, U2, and U3, designated for the folder FD1 to the users U1, U4, and U5 designated for the folder FD2. This allows not only the user U1 but also the users U4 and U5 to use the file f1.

If the file f1 is moved from the folder FD1 to the folder FD2 by the user U2 who is not the specific user, the management server 11 does not change the access privilege of the file f1. In this case, the users U4 and U5 still cannot use the file f1. This prevents information leakage and ensures high confidentiality.

Note that, if the file f1 saved in the storage area 131 managed by the file server 13 is in plain text, the management server 11 changes the access privilege of the file f1 to the access privilege designated for the saving location of the file f1.

More specifically, first, the management server 11 acquires, from the file server 13, the file f1 in plain text and the information on the access privilege designated for the saving location of the file f1 (step S212). Then, the management server 11 encrypts the acquired plain-text file f1 after changing the access privilege according to the information on the access privilege acquired from the file server 13 (step S213). Then, the management server 11 outputs the encrypted file f1 to the storage source of its original file. The original file (file f1 in plain text) is thereby overwritten with the encrypted file f1 (step S214).

However, if the file f1 is in plain text but there is no need to set the access privilege of the file f1, the management server 11 may not change the access privilege of the file f1 (that is, may not set any restrictions on the access privilege of the file f1).

In this manner, in the management system 1 according to the present example embodiment, when a user who has saved a file in the storage area managed by the file server 13 is the specific user, the management server 11 changes the access privilege of the file to the access privilege corresponding to the saving location of the file. This enables the file to be used by the use who will be permitted to access the new saving location, thereby improving convenience. In addition, in the management system 1 according to the present example embodiment, when a user who has saved a file in the storage area managed by the file server 13 is not the specific user, the management server 11 does not change the access privilege of the file. This means that even if, for example, a malicious user moves a file for the purpose of information leakage, the access privilege is not changed and is maintained in the previous state, thereby ensuring high confidentiality. In other words, the management system 1 according to the present example embodiment can improve convenience while ensuring high confidentiality.

The present disclosure can also be achieved by the CPU executing a computer program to perform any process described as a hardware process.

In the above examples, the program can be stored by various types of non-transitory computer-readable media and provided to a computer. Non-transitory computer-readable media include any type of tangible storage media. Examples of non-transitory computer-readable media include magnetic storage media (such as flexible disks, magnetic tapes, and hard disk drives), optical magnetic storage media (such as magneto-optical disks). In addition, examples of non-transitory computer-readable media include Compact Disc Read Only Memory (CD-ROM), CD-R, CD-R/W, Digital Versatile Disc (DVD), and semiconductor memories (such as mask ROM, Programmable ROM (PROM), Erasable PROM (EPROM), flash ROM, and Random Access Memory (RAM)). Tre program may be provided to a computer using any type of transitory computer-readable media. Examples of transitory computer-readable media include electric signals, optical signals, and electromagnetic waves. Transitory computer readable media can provide the program to a computer through a wired communication line (such as electric wires, and optical fibers) or a wireless communication line.

A part or all of the above example embodiments may be described as the following Supplementary notes but are not limited to the following.

Supplementary Note 1

A management device comprising:
a monitoring means for monitoring whether a file has been saved in a storage area managed by a file server;
a determination means for determining, when the monitoring means detects that a file has been saved in the storage area, whether identification information on a user who has saved the file matches identification information on a specific user; and
a privilege change means for changing, when the determination means determines that the identification information on the user who has saved the file matches the identification information on the specific user, an access privilege of the file.

Supplementary Note 2

The management device described in Supplementary note 1, wherein the privilege change means is configured to change the access privilege of the file to an access privilege designated for a saving location of the file.

Supplementary Note 3

The management device described in Supplementary note 1 or 2, wherein the privilege change means is configured not to change the access privilege of the file when the determination means determines that the identification information on the user who has saved the file does not match the identification information on the specific user.

Supplementary Note 4

The management device described in any one of Supplementary notes 1 to 3, wherein
the privilege change means comprises:
an acquisition means for acquiring, when the determination means determines that the identification information on the user who has saved the file matches the identification information on the specific user, an encrypted the file which has been encrypted and information on the access privilege designated for the saving location of the file from the file server;
a decryption means for decrypting the encrypted file acquired by the acquisition means;
an encryption means for encrypting the decrypted file after the access privilege has been changed; and
an output means for outputting the file encrypted by the encryption means to the saving location.

Supplementary Note 5

The management device described in any one of Supplementary notes 1 to 4, wherein the privilege change means is configured to change, when the file is in plain text, the access privilege of the file to the access privilege designated for the saving location of the file, regardless of a determination result of the determination means.

Supplementary Note 6

The management device described in any one of Supplementary notes 1 to 4, wherein the privilege change means is configured not to change, when the file is in plain text, the access privilege of the file, regardless of a determination result of the determination means.

Supplementary Note 7

The management device described in any one of Supplementary notes 1 to 6, wherein the specific user is a user who is permitted to change the access privilege of the file.

Supplementary Note 8

The management device described in any one of Supplementary notes 1 to 7 further comprising a storage means for storing the identification information on the specific user.

Supplementary Note 9

The management device described in any one of Supplementary notes 1 to 8, wherein the identification information on the specific user is identification information on a user who has an access privilege of the file.

Supplementary Note 10

The management device described in any one of Supplementary notes 1 to 9, wherein the identification information on the specific user is identification information on a user whose access frequency to the file server is equal to or greater than a threshold.

Supplementary Note 11

A management system comprising:
a file server configured to save a file and manage an access privilege; and
the management device described in any one of Supplementary notes 1 to 10.

Supplementary Note 12

A management method comprising:
a monitoring step of monitoring whether a file has been saved in a storage area managed by a file server;
a determination step of determining, when it is detected that a file has been saved in the storage area in the monitoring step, whether identification information on a user who has saved the file matches identification information on a specific user; and
a privilege change step of changing, when it is determined that the identification information on the user who has saved the file matches the identification information on the specific user in the determination step, an access privilege of the file.

Supplementary Note 13

A non-transitory computer-readable medium storing a management program to execute:
a monitoring process of monitoring whether a file has been saved in a storage area managed by a file server;
a determination process of determining, when it is detected that a file has been saved in the storage area in the monitoring process, whether identification information on a user who has saved the file matches identification information on a specific user; and
a privilege change process of changing, when it is determined that the identification information on the user who has saved the file matches the identification information on the specific user in the determination process, an access privilege of the file.

Although the invention has been described above with reference to the example embodiments, the invention is not limited to the above example embodiments. Various changes can be made in the configuration and details of the present invention that can be understood by those skilled in the art within the scope of the present invention.

REFERENCE SIGNS LIST

1 Management system
11 Management server
12 Storage unit
13 File server
14 User terminal
15 Management terminal
16 Network
111 Monitoring unit
112 Determination unit
113 Privilege change unit
131 Storage area
1131 Acquisition unit
1132 Decryption unit
1133 Encryption unit
1134 Output unit

What is claimed is:

1. A management device comprising:
at least one memory storing program instructions; and
at least one processor configured to execute the instructions stored in the memory to:
monitor whether a file has been saved in a storage area managed by a file server;
determine, when a file saved in the storage area is detected, whether identification information on a user who has saved the file matches identification information on a specific user; and
change, when the identification information on the user who has saved the file matches the identification information on the specific user, an access privilege of the file,
wherein in a case where the user has moved the file from a first storage area to a second storage area in the storage area, the access privilege of the file is changed from an access privilege designated for the first storage area to an access privilege designated for the second storage area when it is determined that the identification information on the user matches the identification information on the specific user, and the access privilege designated for the first storage area is maintained as the access privilege of the file when it is determined that the identification information on the user does not match the identification information on the specific user.

2. The management device according to claim 1, wherein in the changing of the access privilege, when the identification information on the user who has saved the file matches the identification information on the specific user, the file which has been encrypted and information on the access privilege designated for the saving location of the file are acquired from the file server;
the encrypted file is decrypted;
the decrypted file is encrypted after the access privilege has been changed; and
the encrypted file is output to the saving location.

3. The management device according to any one of claim 1, wherein in the changing of the access privilege, when the file is in plain text, the access privilege of the file is changed to the access privilege designated for the saving location of the file, regardless of a determination result.

4. The management device according to claim 1, wherein in the changing of the access privilege, when the file is in plain text, the access privilege of the file is not changed, regardless of a determination result.

5. The management device according to any one of claim 1, wherein the specific user is a user who is permitted to change the access privilege of the file.

6. The management device according claim 1, wherein the at least one processor is further configured to execute the instructions stored in the memory that stores the identification information on the specific user.

7. The management device according to claim 1, wherein the identification information on the specific user is identification information on a user who has an access privilege of the file.

8. The management device according to any one of claim 1, wherein the identification information on the specific user is identification information on a user whose access frequency to the file server is equal to or greater than a threshold.

9. A management system comprising:
a file server configured to save a file and manage an access privilege; and
the management device according claim 1.

10. A management method comprising:
monitoring whether a file has been saved in a storage area managed by a file server;
determining, when it is detected that a file has been saved in the storage area in the monitoring step, whether identification information on a user who has saved the file matches identification information on a specific user; and
changing, when it is determined that the identification information on the user who has saved the file matches the identification information on the specific user, an access privilege of the file,
wherein in the changing of the access privilege, in a case where the user has moved the file from a first storage area to a second storage area in the storage area, the access privilege of the file is changed from an access privilege designated for the first storage area to an access privilege designated for the second storage area when it is determined that the identification information on the user matches the identification information on the specific user, and the access privilege designated for the first storage area is maintained as the access privilege of the file when it is determined that the identification information on the user does not match the identification information on the specific user.

11. A non-transitory computer-readable medium storing a management program to execute:
a monitoring process of monitoring whether a file has been saved in a storage area managed by a file server;
a determination process of determining, when it is detected that a file has been saved in the storage area in the monitoring process, whether identification information on a user who has saved the file matches identification information on a specific user; and
a privilege change process of changing, when it is determined that the identification information on the user who has saved the file matches the identification information on the specific user in the determination process, an access privilege of the file,
wherein in the privilege change process, in a case where the user has moved the file from a first storage area to a second storage area in the storage area, the access privilege of the file is changed from an access privilege designated for the first storage area to an access privilege designated for the second storage area when it is determined that the identification information on the user matches the identification information on the specific user, and the access privilege designated for the first storage area is maintained as the access privilege of the file when it is determined that the identification information on the user does not match the identification information on the specific user.

* * * * *